United States Patent
Ancona et al.

(10) Patent No.: US 6,669,359 B1
(45) Date of Patent: Dec. 30, 2003

(54) SIFTER ATTACHMENT FOR MIXER

(75) Inventors: Bruce Ancona, New York, NY (US); Robert A. Varakian, Edgewater, NJ (US)

(73) Assignee: Slaton, Inc., Lake Forest, IL (US)

( * ) Notice: Subject to any disclaimer, the term of this patent is extended or adjusted under 35 U.S.C. 154(b) by 0 days.

(21) Appl. No.: 10/055,300

(22) Filed: Nov. 13, 2001

Related U.S. Application Data (63) Continuation-in-part of application No. 09/836,635, filed on Apr. 17, 2001.

(51) Int. Cl.⁷ .................................................. A47J 43/06
(52) U.S. Cl. ..................... 366/197; 366/349; 366/129; 99/452
(58) Field of Search ................................ 209/233, 235; 99/452; 366/129, 130, 197, 349; D7/667

(56) References Cited

U.S. PATENT DOCUMENTS

| | | | |
|---|---|---|---|
| 2,048,183 A | * | 7/1936 | Dormeyer |
| 2,074,162 A | * | 3/1937 | Bowman |
| 2,521,034 A | * | 9/1950 | Bond |
| 2,537,852 A | * | 1/1951 | Peterson |
| 3,063,563 A | * | 11/1962 | Winchell |
| 3,279,265 A | * | 10/1966 | Braun |
| 3,465,800 A | * | 9/1969 | Mcihaelis |
| 4,534,858 A | * | 8/1985 | Aldrich et al. .............. 209/433 |

* cited by examiner

*Primary Examiner*—Joseph Drodge
(74) *Attorney, Agent, or Firm*—Sonnenschein Nath & Rosenthal (57) ABSTRACT

A mixer/sifter combination includes a counter-stand type mixer together with a sifter attachment that is designed to be coupled to the mixer via the mixer's aperture that rotates a typical beater so that the mixer can be used to perform sifting functions. The sifter attachment includes a coupler rod that connects to the mixer, various gears that reduce the rate of rotation of a sifter beater attached to the gears and disposed within a sifter cup of the sifter attachment. The sifter attachment may include a second coupler rod that also connects to the mixer.

16 Claims, 7 Drawing Sheets

SIFTER ATTACHMENT FOR MIXER

RELATED APPLICATION

This application is a continuation-in-part of U.S. application Ser. No. 09/836,635, filed Apr. 17, 2001, the disclosure of which is incorporated herein by reference.

FIELD OF THE INVENTION

The present invention relates generally to kitchen appliances and, more particularly, to a mixer/sifter combination and also to a sifter attachment for use with an electric hand mixer, and a sifter attachment for use with a counter-stand mixer.

BACKGROUND OF THE INVENTION

Counter-stand mixers and electric hand mixers are well known. These devices enable users to mix items in a bowl in an easy and relatively effort free manner. Hand mixers most commonly are used during cooking and baking activities. Most common mixers utilize detachable beaters for easy cleaning and storage.

SUMMARY OF THE INVENTION

It is an object of the present invention to provide a mixer/sifter combination device which performs sifting in a convenient and easy to use manner.

It is another object of the present invention to provide a sifter attachment for an electric hand held mixer which likewise performs sifting in a convenient and easy to use manner.

It is a further object of the present invention to provide a sifter attachment for a counter-stand mixer which also performs sifting in a convenient and easy to use manner.

Various other objects, advantages and features of the present invention will become readily apparent to those of ordinary skill in the art, and the novel features will be particularly pointed out in the appended claims.

In accordance with an embodiment of the present invention, a mixer/sifter combination is provided that includes a counter-stand type mixer that can receive an element to be rotated (e.g., a beater) and to operatively rotate that element. The combination further includes a sifter attachment that can be inserted into the mixer and that sifts a substance when the mixer is operated.

As an aspect of the invention, the sifter attachment includes a coupler rod that is inserted into the mixer, and a sifter beater that is operatively connected to the coupler rod.

As a feature of this aspect, the sifter attachment includes a gear mechanism with a first end coupled to the coupler rod and a second end coupled to the sifter beater.

As another feature, the gear mechanism is adapted to rotate the sifter beater at a rate of rotation less than the rate at which the mixer rotates the coupler rod.

As another aspect of the invention, the sifter attachment includes a sifter cup for holding the substance to be sifted, and the sifter beater is disposed within the sifter cup.

As a further aspect of the invention, the mixer includes an aperture into which a beater can be inserted, and the sifter attachment includes a coupler rod with an end identical to the end of the beater so that the coupler rod can be inserted into the aperture of the mixer.

As an additional aspect, the sifter attachment includes a screen disposed at the bottom of the sifter cup through which the substance passes when it is sifted, and the sifter beater is disposed within and near the bottom of the sifter cup.

As a further aspect, the coupler rod extends from the top of the sifter attachment.

As yet another aspect, the sifter attachment includes a second coupler rod that extends from the top of the sifter attachment and that is received by the mixer.

In accordance with another embodiment of the present invention, a sifter attachment is provided to attach to a typical counter-stand type mixer. The sifter attachment includes a sifter cup, a coupler rod that extends from the top of the sifter cup and can be inserted into the mixer, and a sifter beater disposed within the sifter cup that is operatively connected to the coupler rod to perform the sifting function.

As an aspect of this embodiment, the sifter attachment includes a second coupler rod that extends from the top of the sifter cup and which can received by the mixer; and the two coupler rods collectively prevent rotation of the sifter attachment when the coupler rods are rotated by an attached mixer.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF THE INVENTION

The mixer/sifter of the present invention is comprised of two components, an electric mixer unit and a sifter attachment unit (or simply, sifter attachment). The present invention also is directed to a sifter attachment designed for use with existing electric hand mixers.

Figures 1, 2:
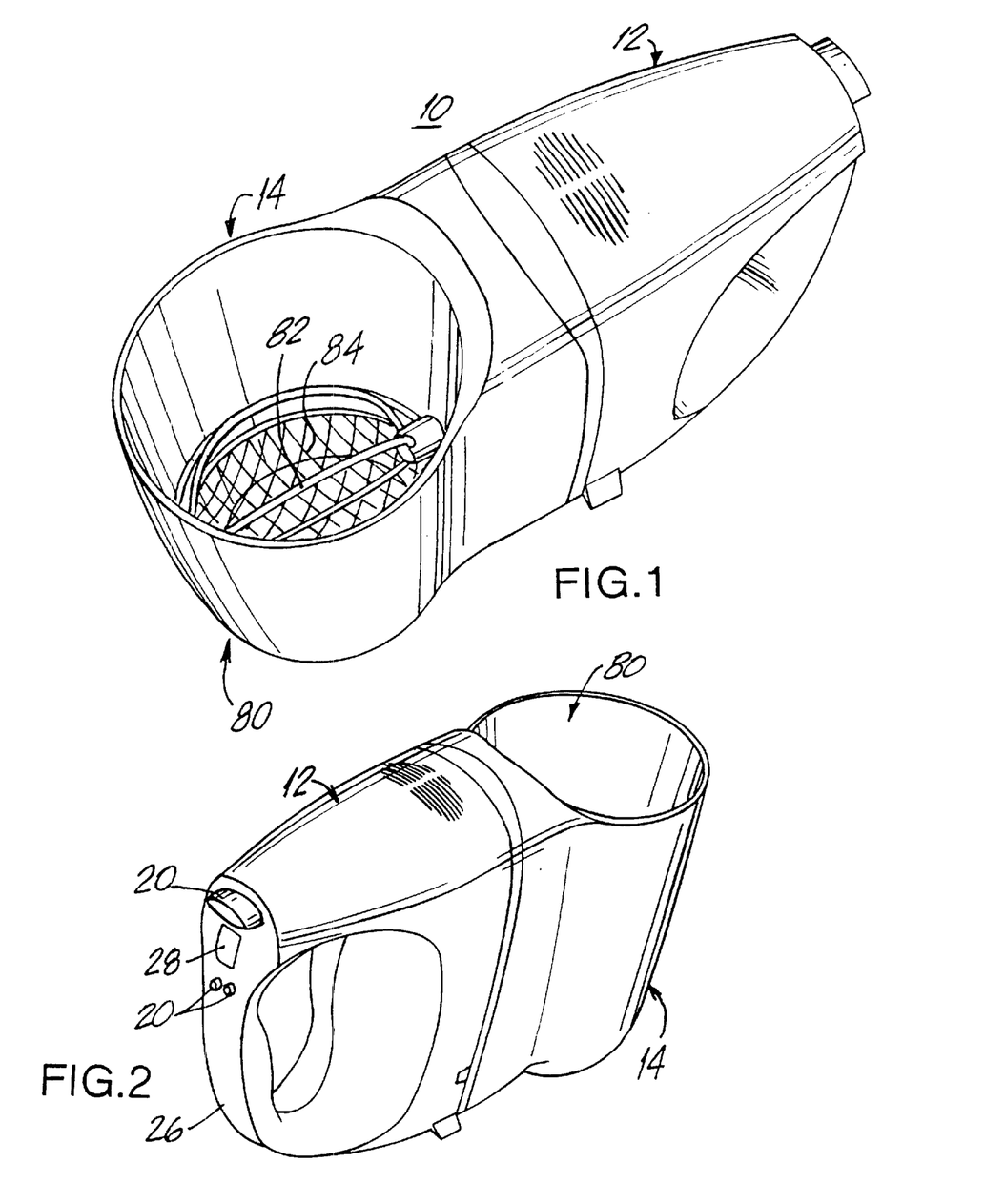
FIG. 1 is a perspective view of the mixer/sifter of the present invention.
FIG. 2 is another perspective view of the mixer/sifter of the present invention.
Figure 3:
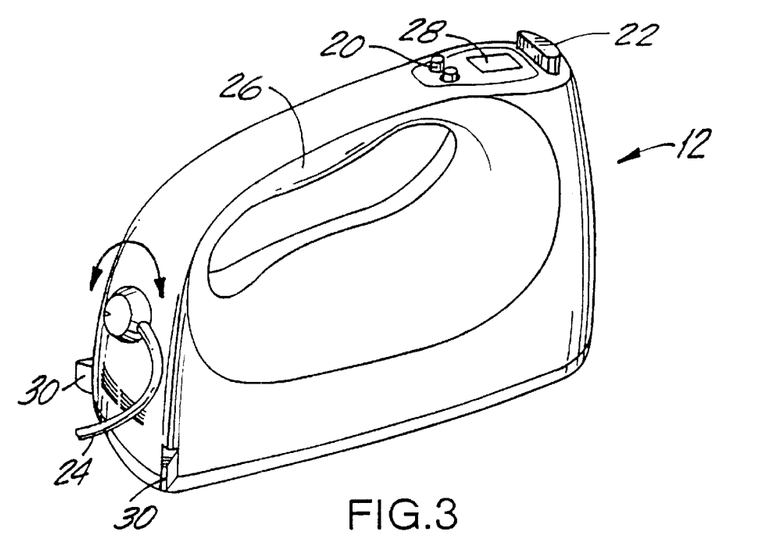
FIG. 3 is a schematic illustration of the electric mixer portion without the sifter attachment connected, in accordance with the present invention.
Figure 4:
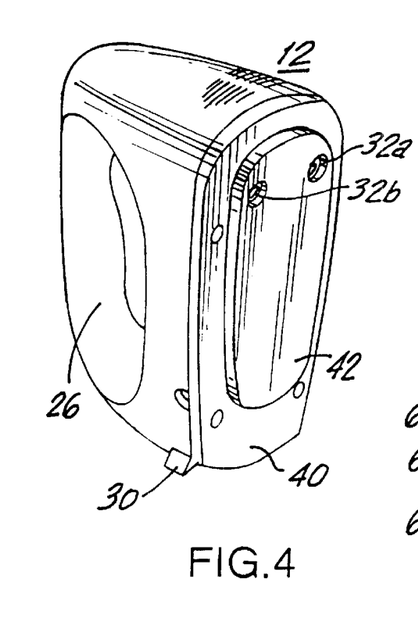
FIG. 4 is another view of the mixer portion of the present invention.

FIGS. 1 and 2 of the drawings schematically illustrate the mixer/sifter combination 10 of the present invention. Mixer/sifter 10 includes an electric mixer 12 and a sifter attachment 14. Mixer 12, shown by itself in FIGS. 3 and 4, includes features and structure that exist in typical electric hand mixers. For example, hand mixer 12 includes speed control and on/off buttons 20, an eject button 22, a power cord 24, a handle 26, an LCD display 28 and feet 30. These features are known in the art and thus descriptions of their operation and design are omitted herein except where necessary for an understanding of the present invention.

Figure 6:
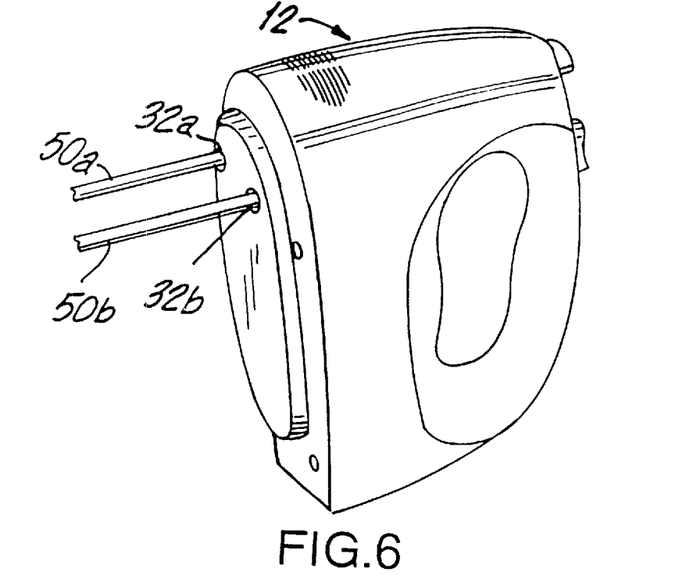
FIG. 6 is another view of the mixer portion of the present invention, partially showing beaters attached thereto.

Mixer 12 of the present invention further includes a bottom surface 40, a surface 42 that protrudes from bottom surface 40 and apertures 32a and 32b disposed within surface 42 (see FIG. 4) that receive typical beaters as well as the sifter attachment of the present invention. Beaters 50a and 50b, partially shown in FIG. 6, are typical beaters in the art and can be attached to mixer 12 by inserting them into apertures 32a and 32b. The specific structure, design and operation of apertures 32a, 32b, as wells as the internal design thereof, and beaters 50a and 50b can be that of any existing hand held electric mixer/beater. When beaters 50a and 50b are inserted into apertures 32a and 32b, mixer 12 of the present invention operates in a manner identical to existing mixers. Likewise, buttons 20 and LCD display 28 operate in a manner well known in the art and their construction, design and operation are the same as that of existing electric hand mixers. Thus, further description thereof is omitted herein except where necessary for an understanding of the present invention. Moreover, mixer 12 includes a motor and additional internal components necessary for its operation, and such components are well known in the art. The internal structure and design of mixer 12 is not pertinent to the present invention. Eject button 22 operates to eject the beaters when depressed, in a manner well known.

Figure 5:
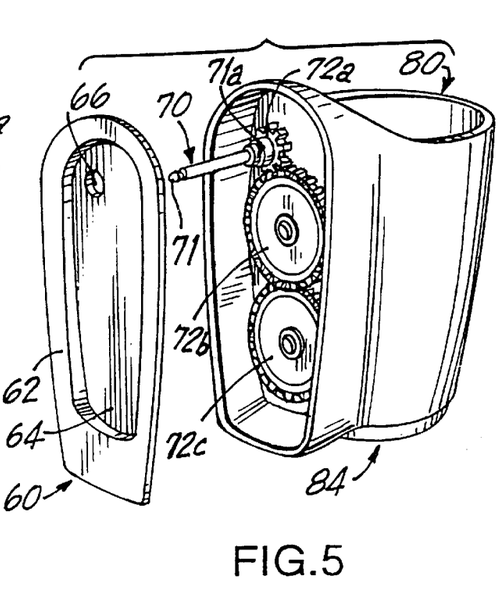
FIG. 5 is a perspective, partially exploded view of the sifter attachment of the present invention.

In accordance with the present invention, mixer 12 can be coupled to sifter attachment 14, which is shown partially exploded in FIG. 5. As previously mentioned with reference to FIG. 4, mixer 12 includes bottom surfaces 40 and 42. Surface 42 is provided to facilitate coupling to sifter attachment 14. Sifter attachment 14 includes, as shown in FIG. 5, a front plate 60, various gear mechanisms and container portion 80. Front plate 60 includes a front surface 62, a recessed surface 64 and an aperture 66 through which a coupler rod 70 extends.

To connect sifter attachment 14 to mixer 12, an end 71 of coupler rod 70 of the sifter attachment is inserted into the mixer's aperture 32a until rod 70 is locked in place. Coupler rod 70 has a size and shape equivalent to that of the ends of beaters 50a and 50b (FIG. 6), that is, that part of beaters 50a and 50b that are inserted into apertures 32a and 32b. Thus, end 71 of rod 70 is inserted into and held by the mixer in a manner identical to how beaters 50a and 50b are inserted and held. When sifter attachment 14 is coupled to mixer 12, front wall 62 of the sifter attachment abuts against bottom surface 40 of the mixer and, similarly, recessed surface 64 of the sifter attachment abuts against surface 42 of the mixer. Protruding surface 42 in connection with the recessed area defined by surface 64 operate to stabilize and support the sifter attachment during use, although it is possible for the sifter attachment to be stabilized in another manner known in the art. However, the design described herein and shown in FIGS. 4 and 5 of the drawings results in an attractive design, proper coupling of the parts, and proper support of the sifter attachment onto the mixer, all without the need for additional attachment devices.

Figure 7:
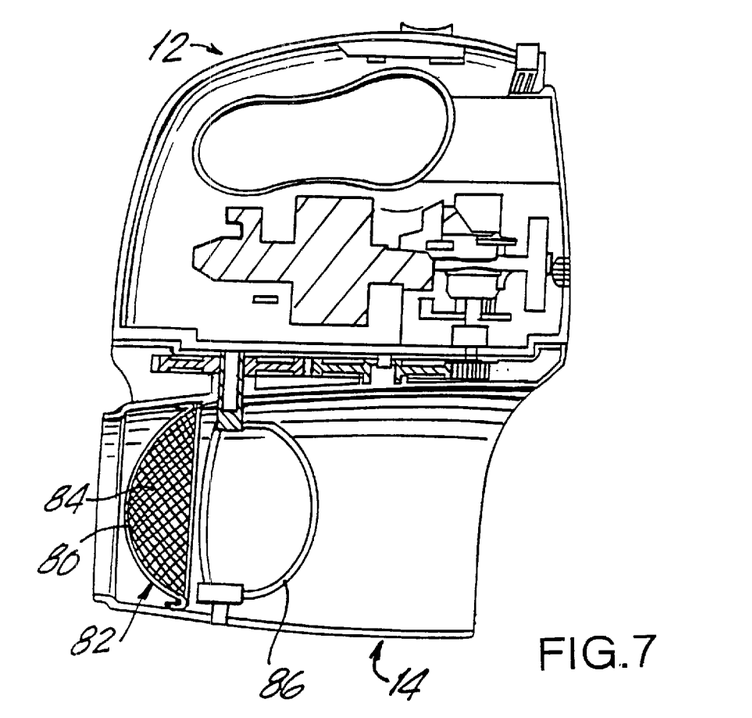
FIG. 7 is a phantom view of the mixer/sifter of the present invention.

As previously mentioned, sifter attachment 14 also includes various gear mechanisms and container portion 80 (also identified herein as a sifter cup). The gear mechanism of the sifter attachment includes coupler rod 70 with coupler rod end 71 which as previously mentioned is inserted into aperture 32a of mixer 12. The other end 71a of coupler rod 70 is directly coupled to a first gear 72a so that gear 72a is driven to rotate when mixer 12 is utilized with the sifter attachment. Gear 72a is disposed adjacent to a second gear 72b which in turn is disposed adjacent to a third gear 72c. Gear 72a drives gear 72b which in turn drives gear 72c. A sifter beater 82, shown in FIGS. 1 and 7, is coupled to and extends from third gear 72c so that sifter beater 82 is driven to rotate as gear 72c rotates. As can be appreciated, gears 72a, 72b and 72c, along with coupler rod 70 driven by mixer 12, collectively operate to drive sifter beater 82 in accordance with the present invention. Moreover, the gears of the sifter attachment are appropriately sized to drive sifter beater 82 at a rate of rotation best suitable for performing sifting functions, which generally is substantially slower than the rate at which coupler rod 70, as well as beaters 50a, 50b when connected, is driven to rotate. Still further, the gear mechanism enables sifter beater 82 to be disposed near the bottom of sifter cup 80, as shown in FIG. 1.

With reference to FIG. 7, sifter beater 82 is designed to include a number of curved blades 86 similar to that of existing sifters. Of course, other blade designs and the number of blades may vary as that shown herein. Sifter attachment 14 also includes a screen 84 at the bottom of sifter cup 80 to facilitate the sifting feature of the sifter attachment, and the shape, size and design of screen 84 can be the same as that of any suitable screens used within existing sifters. Finally, the gear mechanism (including gears 72a, 72b, 72c) of sifter attachment 14 can include additional components, such as structure to stabilize motion of components therein, such as would be well known in the art.

During use, and upon connection of sifter attachment 14 to mixer 12, the combined mixer/sifter is utilized with bottom surface 40 facing sideways (not down) so that sifter cup 80 can be filled with any appropriate substance (e.g., sugar) to be sifted. This is in contrast to when mixer 12 is used as a typical mixer (e.g., when beaters 50a and 50b are attached), at which point bottom surface 40 is positioned facing down to carry out mixing of ingredients in a bowl. After a substance to be sifted is placed in sifter cup 80, mixer 12 is turned on utilizing buttons 20 which, in turn, causes coupler rod 70 to rotate at a relatively high rate of rotation. The gear mechanism of the sifter attachment in turn drives sifter beater 82 to rotate at a relatively slow rate of rotation thus causing the inserted substance to be sifted through screen 84. When completed, mixer 12 is turned off. Finally, eject button 22 is depressed to disconnect sifter attachment 14 from mixer 12.

As described above, the combination mixer/sifter of the present invention includes two main components, mixer 12 and sifter attachment 14. Mixer 12 is of a design similar to that of existing electric hand mixers. Moreover, mixer 12 operates in a manner identical to that of existing electric hand mixers and may be used with typical beaters (e.g., 50a, 50b) and operated in a manner well known in the art. When mixer 12 is coupled to the sifter attachment of the present invention, the combined device enables for sifting in a manner not previously contemplated. Sifter attachment 14 efficiently enables for electric sifting utilizing a hand mixer and detaches from the mixer for easy cleaning and storage.

Sifter attachment 14 is relatively compact and generally is of a size relatively comparable to that of the mixer. However, sifter attachment can be designed so that the sifter cup can be larger or smaller than that shown in the drawings. Thus, sifter attachment can be relatively large to accommodate a large volume sifter cup but, at the same time, be designed in accordance herein to be used with a relatively small hand mixer. Conversely, sifter attachment can be designed to be relatively small if small sifting tasks are only needed, by providing a relatively small sifter cup 80.

Moreover, and in accordance with another embodiment of the present invention, the sifter attachment can include a detachable sifter cup (not shown) which includes primarily a cup for holding the substance to be sifted and the sifter beater. In such case, the detachable sifter cup can be attached to mixer 12 via a sifter adapter (not shown) which is comprised primarily of a coupler rod (equivalent to coupler rod 70), a front panel (equivalent to panel 60), a gear mechanism (equivalent or similar to gears 72a, 72b, 72c), and a body including rear and side panels. Here, the rear panel of the sifter adapter may have a surface device similar to the bottom surface (including surfaces 40, 42) of mixer 12, and the detachable sifter cup may include a connecting surface similar to the front plate 60 of the sifter attachment 14. Further, the sifter beater disposed within the detachable sifter cup may include a connecting end that extends out from the sifter cup and has a design similar to coupler rod 70. Of course, other designs of such a detachable sifter cup and sifter adapter are possible.

The sifter attachment of the present invention may include a flat front plate 60, or other suitable design, so that it can be coupled to existing electric, hand mixers.

Figure 8:
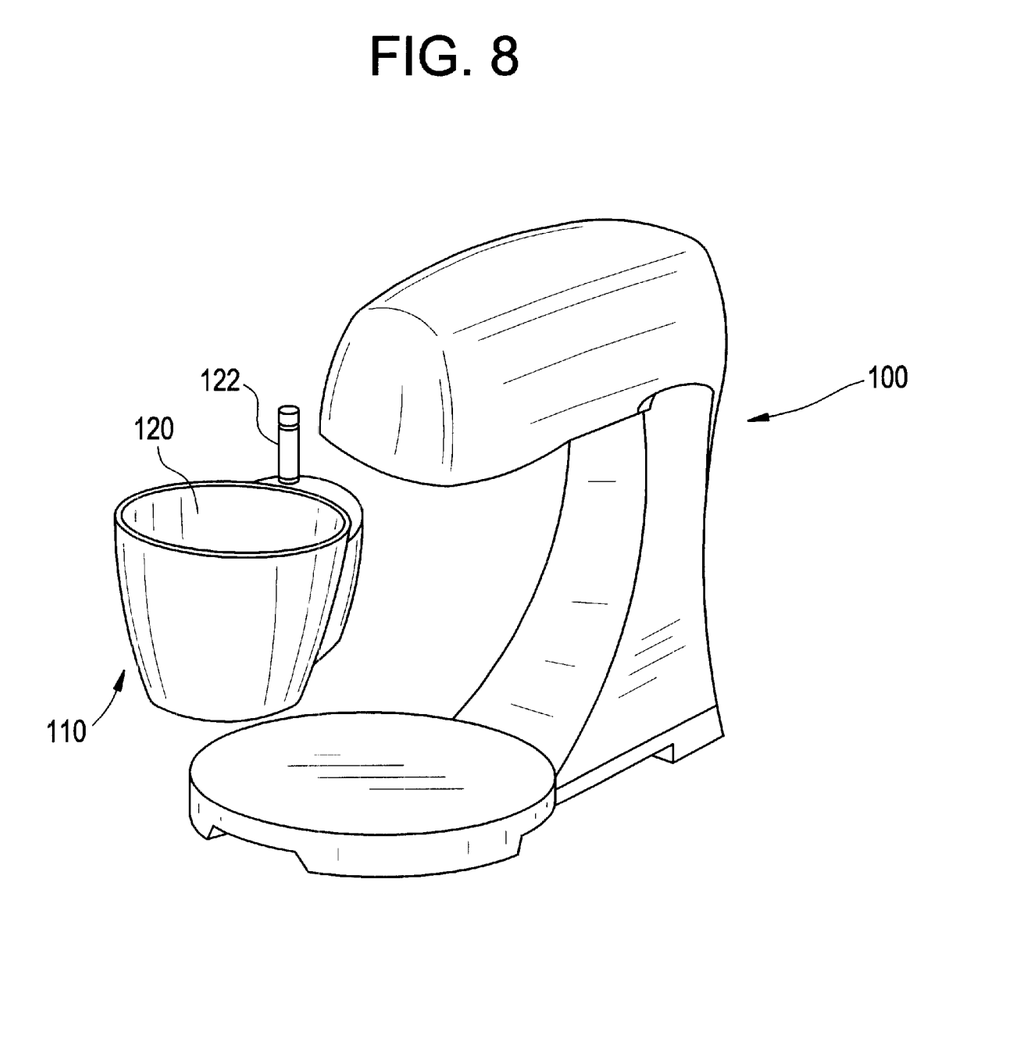
FIG. 8 is a perspective view of the sifter attachment in accordance with another embodiment of the present invention next to an ordinary counter-stand mixer.
Figure 9:
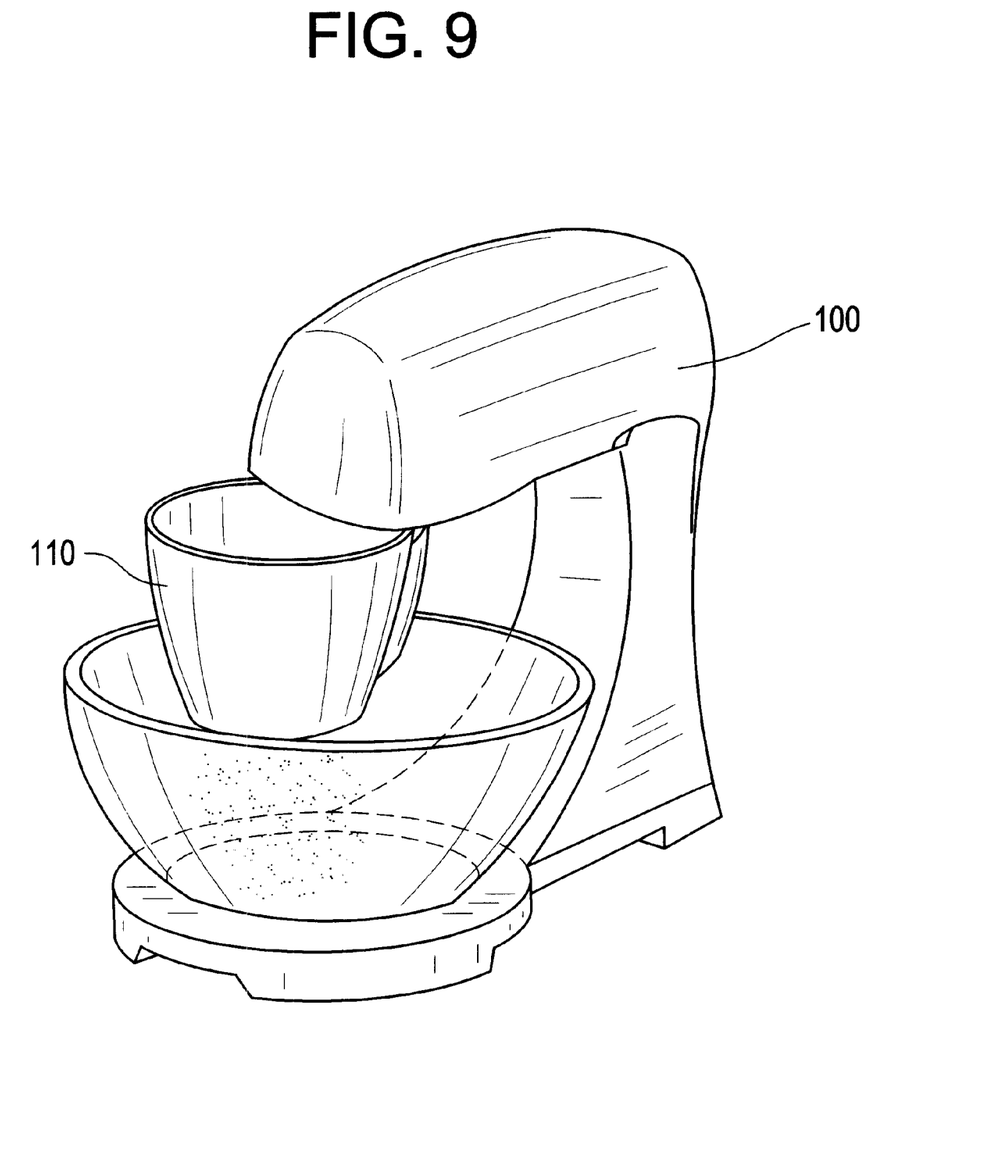
FIG. 9 is a perspective view of the sifter attachment of FIG. 8 shown coupled to the counter-stand mixer.

The present invention also concerns sifter attachments for use with counter-stand mixers, such as shown in FIG. 8. A counter-stand (also called counter-top) mixer 100 may be any typical counter-stand mixer of the type in which its beaters are removable. In accordance with the present invention, a sifter attachment 110 includes a container portion (also called sifter cup) 120 and a coupler rod 122 wherein coupler rod 122 is designed so that it can be inserted into counter-stand mixer 100 via one of the mixer's apertures (not shown) that normally accepts a beater. FIG. 9 shows the combination when connected. As would be appreciated, the basic operation of the combined counter-stand mixer and sifter attachment is similar to that of the previously described embodiment.

Figure 10:
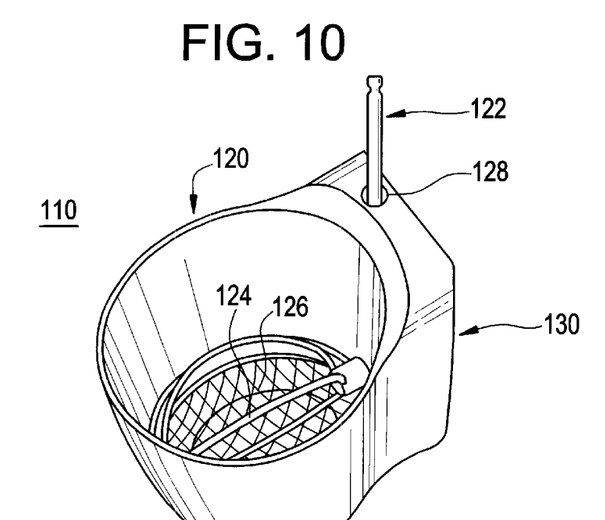
FIG. 10 is another perspective view of the sifter attachment shown in FIG. 8.
Figure 11:
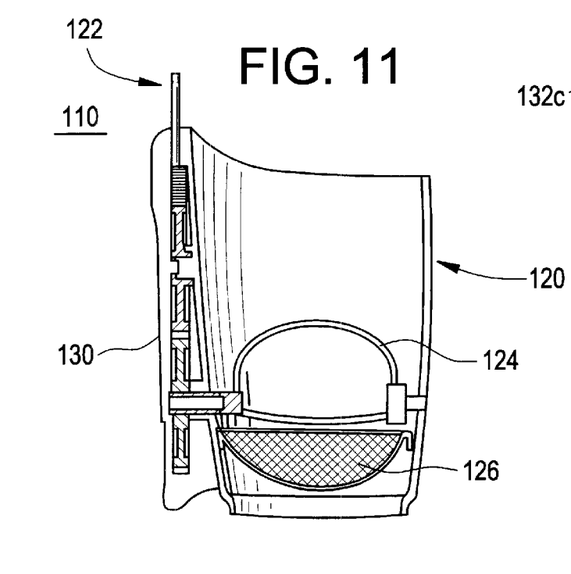
FIG. 11 is a phantom view of the sifter attachment shown in FIG. 8.
Figure 12:
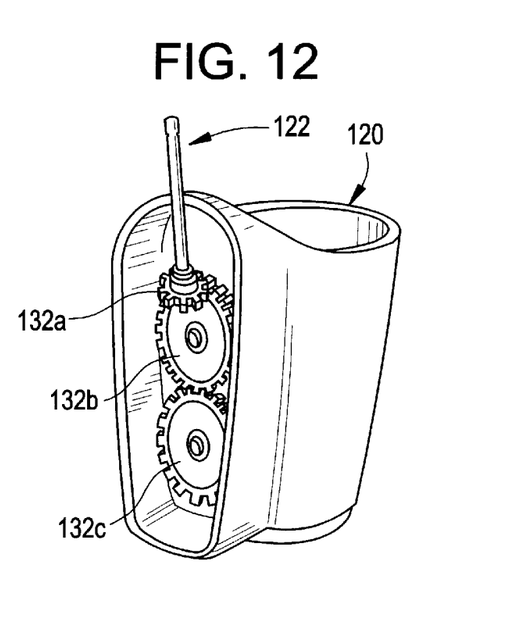
FIG. 12 is a perspective view of the sifter attachment of FIG. 8 shown to reveal the gear mechanism compartment.

Referring to FIGS. 10 and 11 of the drawings, sifter attachment 110 includes container portion 120, coupler rod 122 extending through an aperture 128, a sifter beater 124, a screen 126 and a gear mechanism compartment 130. With reference to FIG. 12 (shown with a portion of a wall of the gear mechanism compartment not shown), the gear mechanism compartment includes therein a set of gears 132a, 132b and 132c. Coupler rod 122 is connected to gear 132a, which drives gear 132b, which drives 132c, which in turn is coupled to (see FIG. 11) and drives sifter beater 124. The gear mechanism and operation of sifter attachment 110 is similar to that of the previously described sifter attachment except the gear mechanisms of sifter attachment 110, as shown in FIG. 12, provides for coupler rod 122 to extend from the top of the sifter attachment, rather from its side (as in the case of the previously described embodiment), so that sifter attachment 110 can be easily connected to any typical counter-stand mixer. Gears 132a, 132b and 132c are fixed to the gear compartment in any suitable manner known in the art.

Figure 13:
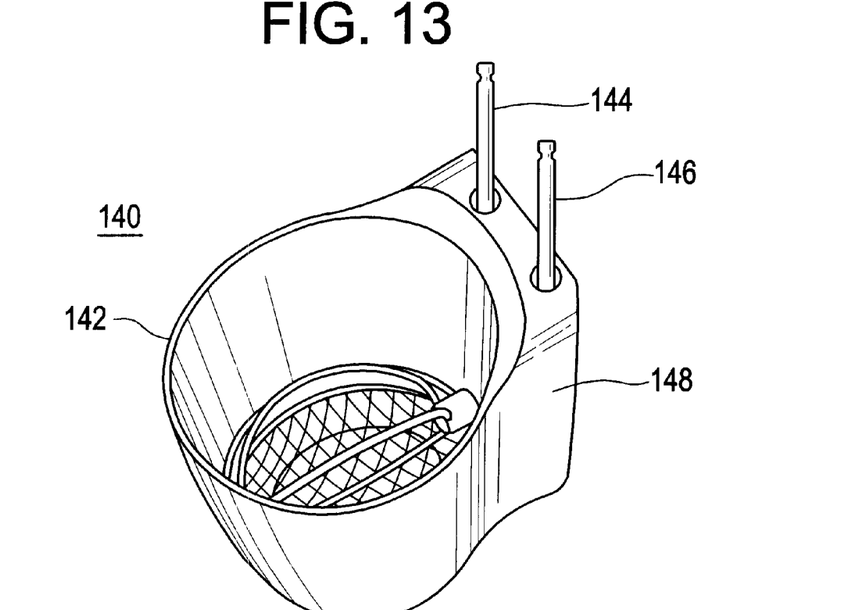
FIG. 13 is a perspective view of a sifter attachment in accordance with a further embodiment of the present invention.
Figure 14:
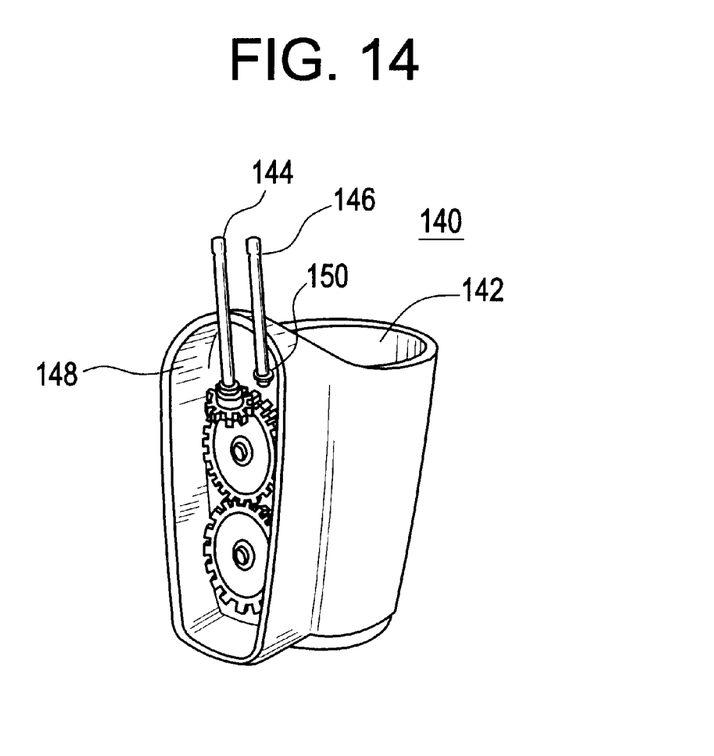
FIG. 14 is another perspective view of the sifter attachment shown in FIG. 13.

FIGS. 13 and 14 illustrate a sifter attachment 140 in accordance with another embodiment of the present invention. Sifter attachment 140 is substantially similar to sifter attachment 110 shown in FIGS. 10–12 and includes all of the components of sifter attachment 110. In addition to container portion 142, coupler rod 144 (and the other components previously discussed), sifter attachment 140 includes a second coupler rod 146 which, like coupler rod 144, is designed to be inserted into one of the apertures of the counter-stand mixer (e.g., mixer 100 shown in FIGS. 8 and 9). That is, to connect sifter attachment 140 to a counter-stand mixer, coupler rods 144 and 146 are inserted into the two apertures of the counter-stand mixer that normally receive beaters. Of course, the distance between the two coupler rods 144 and 146 may be modified during design and construction to accommodate different sized counter-stand mixers.

In accordance with this embodiment, coupler rod 146 is rotatably coupled within the gear mechanism compartment 148 to the sifter attachment by any known suitable attachment device 150. Coupler rod 146 serves to stabilize the sifter attachment so that the sifter attachment does not rotate during operation. In operation, the counter-stand mixer rotates both coupler rods 144 and 146, and the rotation of coupler rod 144 causes the sifter beater to rotate in the manner previously discussed. Coupler rod 146, while rotating, does not cause any other component to rotate, but rather ensures that container portion 142 remains stationary during operation.

Alternatively, rather than include a second coupler rod, the sifter attachment of the present invention may include a mechanical connection from its exterior to the body of the counter-stand mixer to provide stability and to prevent rotation of the sifter attachment itself.

While the present invention has been particularly shown and described in conjunction with a preferred embodiment thereof, it will be readily appreciated by those of ordinary skill in the art that various changes may be made without departing from the spirit and scope of the invention. For example, while particular gear mechanisms have been shown and described to include three gears, the present invention is not limited to this design and may include other mechanisms, and/or additional or fewer gears that carry out the same function as that described herein.

As another example, the present invention is not limited to the specific designs shown in the drawings. For example, the sifter cup may have a different shape than that shown.

Therefore, it is intended that the appended claims be interpreted as including the embodiments described herein, the alternatives mentioned above, and all equivalents thereto.

What is claimed is:

1. A mixer/sifter combination comprising:

a counter-stand type mixer adapted to receive an element to be rotated and to operatively rotate the received element; and a sifter attachment adapted to be received by the mixer and to sift a substance when the mixer is operated;

wherein the sifter attachment includes a coupler rod extending from a top of the sifter attachment and adapted to be received by the mixer; the sifter attachment further including a sifter cup and a sifter beater disposed within the sifter cup and operatively connected to the coupler rod; and wherein the sifter attachment includes a second coupler rod extending from the top of the sifter attachment and adapted to be received by the mixer.

2. A mixer/sifter combination comprising:
a counter-stand type mixer adapted to receive an element to be rotated and to operatively rotate the received element; and
a sifter attachment adapted to be received by the mixer and to sift a substance when the mixer is operated;
wherein the mixer includes two apertures adapted to receive ends of respective beaters, and the sifter attachment includes first and second coupler rods having respective ends substantially identical to the ends of the beaters so that the first and second coupler rods can be received by the apertures of the mixer; and the sifter attachment further includes a sifter beater operatively connected to one of the first and second coupler rods so that the mixer can operatively rotate the sifter beater.

3. A sifter attachment for a counter-type stand mixer having an aperture for receiving an end of an element to be operatively rotated, the sifter attachment comprising:
a sifter cup;
a coupler rod extending from a top of the sifter cup and adapted to be received by the aperture of the mixer;
adapted a sifter beater disposed within the sifter cup and operatively connected to the coupler rod and adapted to perform a sifting function; and
a second coupler rod extending from the top of the sifter cup and adapted to be received by the mixer; said coupler rod and said second coupler rod collectively preventing rotation of the sifter attachment when the first and second coupler rods are rotated by an attached mixer.

4. An apparatus for performing a mixing function and a sifting function, comprising:
a mixing base structure including:
a base;
a top portion; and
a supporting portion extending upward from said base, said supporting portion which supports said top portion thereon;
wherein said top portion includes a first aperture within a lower surface of said top portion, said first aperture which is adapted to receive a sifting attachment;
a sifting attachment including:
a container portion; and
a first coupling attachment extending upward from said container portion;
wherein said first coupling attachment is inserted into said,first aperture in said lower surface of said top portion, and attaches said sifting attachment to said lower surface to rotate said sifting attachment.

5. The apparatus of claim 4, wherein said sifting attachment further comprises:
a sifter beater; and
a screen;
wherein said sifter beater and said screen are disposed in said container portion.

6. The apparatus of claim 5, wherein said sifting attachment includes:
a gear mechanism which couples said first coupling attachment to said sifter beater, such that said sifter beater can be rotated using said first coupling attachment.

7. The apparatus of claim 6, wherein said gear mechanism is adapted to rotate said sifter beater at a rate of rotation less than a rate of rotation of said first coupling attachment.

8. The apparatus of claim 7, further comprising a second coupling attachment disposed proximate to said first coupling attachment, and extending upward from said container portion.

9. The apparatus of claim 4, wherein said base structure is a counter-top electric mixer.

10. The apparatus of claim 4, wherein said first coupling attachment is a first coupler rod.

11. The apparatus of claim 10, wherein said second coupling attachment ensures that said container portion remains stationary during a sifting operation, and said second coupling attachment does not rotate said sifter beater.

12. The apparatus of claim 10, wherein said second coupling attachment is a second coupler rod.

13. An apparatus for performing a mixing function and a sifting function, comprising:
means for mixing a substance;
means for sifting a substance;
an attachment mechanism disposed between said mixing means and said sifting means, for coupling said mixing means to said sifting means;
wherein said attachment mechanism includes a first coupler which rotates said sifting means, and speed from a second coupler which does not rotate said sifting means.

14. A sifting attachment for a mixing and sifting apparatus, comprising:
a container portion; and
a first coupling attachment extending upward from a peripheral portion of said container portion;
wherein said first coupling attachment is adapted to be inserted into a first aperture of an underside of the mixing and sifting apparatus, to rotate said container portion.

15. The sifting attachment of claim 14, further comprising:
a second coupling attachment extending upward from said container portion and adapted to be inserted into a second aperture of the lower portion of the mixing and sifting apparatus.

16. The sifting attachment of claim 15, wherein said second coupling attachment does not rotate the container portion.

* * * * *